(12) United States Patent
Reiss (10) Patent No.: US 8,995,902 B2
(45) Date of Patent: Mar. 31, 2015

(54) LINK 16-BASED GEOLOCATION OF HOSTILE JAMMERS

(75) Inventor: Joel D. Reiss, Bloomfield, NJ (US)

(73) Assignee: BAE Systems Information and Electronic System Integration Inc., Nashua, NH (US)

( * ) Notice: Subject to any disclaimer, the term of this patent is extended or adjusted under 35 U.S.C. 154(b) by 75 days.

(21) Appl. No.: 13/879,556

(22) PCT Filed: Aug. 10, 2012

(86) PCT No.: PCT/US2012/050354
§ 371 (c)(1),
(2), (4) Date: Apr. 15, 2013

(87) PCT Pub. No.: WO2013/066463
PCT Pub. Date: May 10, 2013

(65) Prior Publication Data
US 2014/0038541 A1  Feb. 6, 2014

Related U.S. Application Data

(60) Provisional application No. 61/522,710, filed on Aug. 12, 2011.

(51) Int. Cl.
*H04K 3/00* (2006.01)
*H04B 15/00* (2006.01)

(52) U.S. Cl.
CPC . *H04B 15/00* (2013.01); *H04K 3/22* (2013.01)
USPC ............ 455/1; 455/303; 455/456.6; 342/353; 342/432; 342/444; 342/453

(58) Field of Classification Search
USPC ........... 455/1, 296, 303, 456.1–457; 342/353, 342/432, 444, 453
See application file for complete search history.

(56) References Cited

U.S. PATENT DOCUMENTS

| 4,990,920 | A | * | 2/1991 | Sanders, Jr. ...................... 342/14 |
| 5,008,679 | A | * | 4/1991 | Effland et al. .................. 342/353 |
| 5,459,473 | A | | 10/1995 | Dempster et al. |
| 5,969,674 | A | * | 10/1999 | von der Embse et al. . 342/357.2 |
| 6,018,312 | A | * | 1/2000 | Haworth ........................ 342/353 |
| 6,114,995 | A | | 9/2000 | Ketchum |
| 6,405,047 | B1 | * | 6/2002 | Moon ......................... 455/456.1 |

(Continued)

FOREIGN PATENT DOCUMENTS

EP      1198757       11/2003

OTHER PUBLICATIONS

R.S. Lokuta, JTIDS Electromagnetic Compatibility in the 960-1215 MHz Band[online], Jan. 1992. [Retrieved on Mar. 14, 2013]. Retrieved from Internet: <http://www.dtic.mil/dtic/tr/fulltext/u2/a247834.pdf>; entire document, especially; pp. 13, 19, 27, 30, 119, 123.

*Primary Examiner* — Edward Urban
*Assistant Examiner* — Rui Hu
(74) *Attorney, Agent, or Firm* — Daniel J. Long (57) ABSTRACT

A method for Link 16-based geolocation of hostile jammers comprising the steps of collecting jamming noise I/Q samples at a plurality of locations, determining the relative time delay of reception between two or more of the locations, determining the first derivative of the time delay of reception between the two or more locations, and using the results calculated in the preceding step to determine the position of the hostile jammers.

16 Claims, 7 Drawing Sheets

(56) References Cited

U.S. PATENT DOCUMENTS

| | | |
|---|---|---|
| 6,516,021 B1 | 2/2003 | Abbott et al. |
| 6,529,165 B1* | 3/2003 | Duffett-Smith et al. ...... 342/463 |
| 6,618,009 B2* | 9/2003 | Griffin et al. ................. 342/432 |
| 8,390,515 B2* | 3/2013 | Ketonen ........................ 342/450 |
| 2002/0012411 A1 | 1/2002 | Heinzl et al. |
| 2002/0041566 A1* | 4/2002 | Yang et al. .................... 370/229 |
| 2002/0070889 A1* | 6/2002 | Griffin et al. ................. 342/353 |
| 2003/0117319 A1* | 6/2003 | Rideout et al. ................ 342/453 |
| 2003/0125026 A1* | 7/2003 | Tsunehara et al. ............ 455/435 |
| 2010/0045506 A1* | 2/2010 | Law et al. ....................... 342/13 |
| 2010/0201570 A1* | 8/2010 | Shemar et al. ........... 342/357.59 |
| 2010/0283678 A1* | 11/2010 | Ketonen ................... 342/357.49 |
| 2012/0032854 A1* | 2/2012 | Bull et al. ..................... 342/450 |
| 2013/0093625 A1* | 4/2013 | Smith ........................... 342/387 |

\* cited by examiner

LINK 16-BASED GEOLOCATION OF HOSTILE JAMMERS

CROSS REFERENCE TO RELATED PATENT APPLICATIONS

The instant patent application claims priority to U.S. Provisional Patent Application Ser. No. 61/522,710 entitled "Method for Link 16-Based Geolocation of Hostile Jammers" having a filing date of Aug. 12, 2011, which is hereby incorporated by reference in its entirety.

FIELD OF THE INVENTION

The exemplary and non-limiting embodiments of this invention relate generally to methods, devices and computer programs, and, more specifically, to the location of hostile jammers by their geographical location.

BACKGROUND OF THE INVENTION

The United States Department of Defense uses the 960-1215 MHz frequency band for the Joint Tactical Information Distribution System (JTIDS), and its successor multifunctional information distribution system (MIDS), as well as other functionally similar tactical data link systems. The term "Link 16" is commonly used to refer to these tactical data link systems (as well as these acronyms). Link 16 is employed in frontline land, air and naval equipment in the United States, as well as by the North Atlantic Treaty Organization (NATO) and allied nations.

Link 16 is based upon time division multiple access (TDMA) technology and static time slot assignments. Link 16 terminals include wireless terminals such as the MIDS joint tactical radio system (JTRS) or MIDS low volume terminal (LVT). MIDS JTRS are wireless terminals employing software defined radio (SDR), which have jamming resistance capabilities and provide secure real-time information and situation awareness by way of digital and voice communications for various United States and allied military platforms (e.g., Jet fighters such as the F/A-18, F-15 or F-16, early warning aircraft such as the E2, bomber aircraft such as the B1, as well as shipboard and land based missile launchers). MIDS-LVT is the predecessor to MIDS JTRS which offered less functionality and fewer channels for JTRS waveforms.

It recently has been shown that the Link 16 waveform is vulnerable to jamming, such as by networks of high powered enemy jamming resources which can be deployed in such a way as to saturate the Link 16 terminal's band of operation—effectively degrading the terminal performance or rendering it completely inoperable. Hence, there is a critical need for detection of such hostile jamming resources as well as the identification of the geographic location ("geo-location") of an each jamming station in the enemy's network. Geo-location of hostile jammers would permit frontline military personal the option of either avoiding or neutralizing the jamming stations.

SUMMARY OF INVENTION

In the invention there is a method and computer program for Link 16-based geolocation of hostile jammers, comprising the steps of: (a) collecting jamming noise amplitude and phase samples at a plurality of locations, (b) determining a relative time delay of reception between two or more of the locations, (c) determining a first derivative of the time delay of reception between the two or more locations, and (d) using results calculated in step (c) to determine a position of at least one hostile jammer.

In one exemplary embodiment, the amplitude and phase samples are collected at a sampling interval equal to a multiple of one Link 16 time division access slot within a tactical digital information access slot J message employing packed two double pulse data format. The sampling rate can be, for example, 5 megahertz, and a sampling cell length is 10 nanoseconds.

In one exemplary embodiment, the relative time delay is determined by a velocity tracking function. The velocity tracking function can be a geolocation Kalman filter configured to determine a delta range and delta range rate utilizing two data streams merged at a common location and using the correlation peaks value cell number as its basic input source. Alternatively, the velocity tracking function is a correlation low pass filter.

In yet another embodiment, a Newton Raphson function is applied to the output of the Kalman Filter to obtain a precise velocity measurement.

In another embodiment, a pre filter is applied to the collected jamming noise amplitude and phase samples prior to determining the relative time delay of reception between two or more of the locations.

The jamming noise amplitude and phase samples can, in one embodiment, be collected by one or more broadband digital transceivers in a Link 16 terminal employing a Link 16 terminal-J system architecture. Alternatively, the jamming noise amplitude and phase samples are collected by one or more broadband digital receivers in a radar warning receiver and the samples are output to a class two Link 16 terminal to preform steps (b)-(d).

These and other embodiments and aspects are detailed below with particularity.

BRIEF DESCRIPTION OF THE DRAWINGS

The foregoing and other aspects of the exemplary embodiments of this invention are further explained in the following Detailed Description, when read in conjunction with the attached Drawing Figures.

RETAILED DESCRIPTION OF THE PREFERRED EMBODIMENTS

Hereinafter, exemplary embodiments of the present invention will be described with reference to the accompanying drawings. It should be noted that similar components are designated by similar reference numerals although they are illustrated in different drawings. For the purposes of clarity and simplicity, detailed descriptions of known functions and configurations incorporated herein will be omitted as they may obscure the subject matter of the present invention. Throughout this disclosure the term "Link 16 community member" refers to various "platforms" equipped with Link 16 terminals. A "platform" is a military type or commercially contracted aircraft, ship or land based piece of military equipment, not limited to jetfighters, bombers, early warning aircraft, transport aircraft, helicopters, drones, ships of various sizes and utility, tanks, armored personnel carriers, Humvees and other land based personal carriers, as well as land-based and seaborne weapons systems. A "cooperator" as used throughout this disclosure is a platform equipped with Link 16 terminal-based geolocation configured in accordance with exemplary embodiments of the present invention. Also, as used throughout this disclosure the term Joint Tactical Information Distribution System (JTIDS) is used interchangeably with the word Link 16.

As will be described in more detail below, some exemplary embodiments of this invention provide methods and computer programs that provide Link 16 terminal-based geolocation of at least one hostile jammer or jammer network, comprising the steps of (a) collecting a plurality of jamming noise I/Q samples at two or more locations, (b) determining the relative time delay of reception between two or more of the locations, (c) determining the first derivative of the time delay of reception between the two or more locations, and (d) using the results calculated in step (c) to determine the position of the at least one hostile jammer or jammer network. In one exemplary embodiment of the present invention, the Link 16 terminal is a multifunctional information distribution system (MIDS) joint tactical radio system (JTRS) terminal. In an alternative exemplary embodiment, the link 16 terminal is an MIDS low volume terminal (LVT), or any other link 16 terminal employing a MIDS-J system architecture. In yet another alternative embodiment, the Link 16 terminal is a Class II Link 16 terminal coupled to a radar warning receiver.

Figure 1:
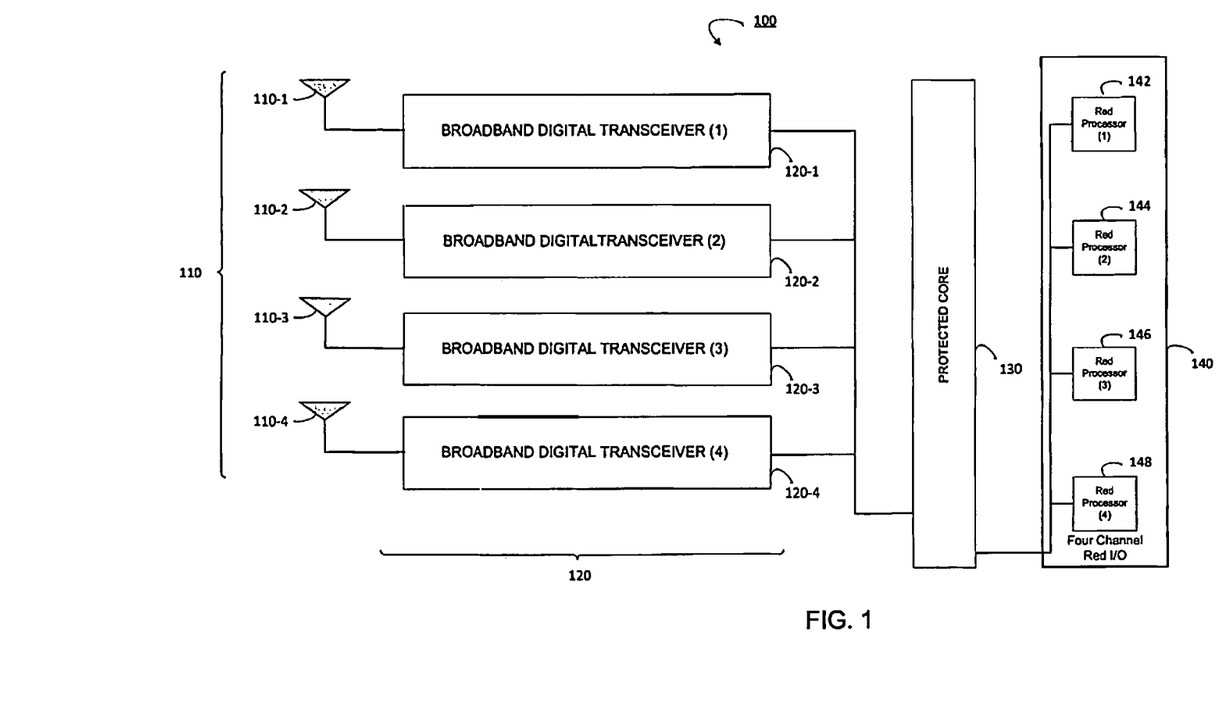
FIG. 1 is a simplified block diagram of a Link 16 terminal employing a MIDS-J system architecture, which is an example of a device suitable for use in practicing some exemplary embodiments of the invention.

FIG. 1 is a simplified block diagram of a Link 16 terminal employing a MIDS-J system architecture 100, which is an example of a device suitable for use in practicing some exemplary embodiments of the invention. As shown in FIG. 1, the relevant components of the MIDS-J system architecture are a plurality of wideband digital transceivers (WDT) 120, a plurality of antennas 110, a protected core 130, and a four channel input/output (I/O) port 140. In the example shown in FIG. 1, the Link 16 terminal comprises four broadband digital transceivers (BDTs), each coupled to an individual antenna, such as: BDT 120-1 coupled to antenna 110-1, BDT 120-2 coupled to antenna 110-2, BDT 120-3 coupled to antenna 110-3, or BDT 120-4 coupled to antenna 110-4. Each broadband digital receiver also is coupled to the protected core 130 by way of a so-called "black port," which signifies the fact that the data received by each broadband digital transceiver is encrypted.

The protected core 130 is coupled to the four channel I/O port 140 by way of a so-called "red port," which signifies the fact that the data output from the core is unencrypted. The four channel I/O ports 140 include four red processors: red processor 1 (142), red processor 2 (144), red processor 3 (148), and red processor 4 (148). Each of the four channel 110 ports 140 can handle both data and voice communications over the 960-1215 MHz frequency band. For example, red processor 1 (142) could be designated for Joint Tactical Information Distribution System (JTIDS) (Channel 1) communications providing 10/100 Ethernet data services and multiple voice ports. Red processor 2 (144) could be designated for satellite communications (SATCOM) (channel 2) providing 1000 Ethernet data services. Red processor 3 (146) could be designated for air traffic control (ATC) communications (Channel 3), a voice port and 1000 Ethernet data services. Red processor 4 (148) could be designated for military strategic and tactical relay (MILSTAR) communications (Channel 4) providing a voice port and 10/100 Ethernet data services.

As known in the art, Link 16 navigation based upon establishes the precise time synchronization and position, velocity and alignment correlation among all community members. The navigation software to employed in Link 16 terminals, such as that shown in FIG. 1, achieves accurate Link 16 community navigation through the use of relative range (or pseudorange) measurements between community members. Link 16 provides a common navigation solution employing the world geodetic system (WGS) 84 geodetic coordinates. Navigation design is based on the optimal combination of: (i) inertial navigation system (INS) sensed acceleration from the host navigation system, (ii) accurate time-of-arrival (TOA) range measurements associated with each received precise participant location and identification (PPLI) message, and (iii) global positioning system (GPS) time and position measurements (if available). Time based synchronization of multiple platforms of less than 10 nanoseconds can be achieved in a Link 16 terminal employing the above described optimal combinations.

Figure 2:
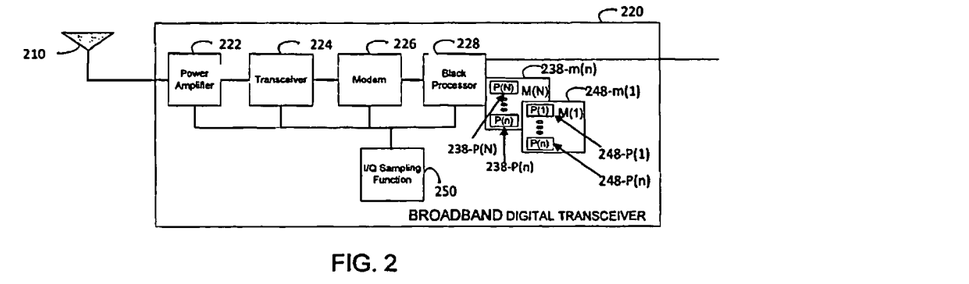
FIG. 2 is a simplified block diagram of a broadband digital transceiver, which depicts an example of a device suitable for use in practicing some example embodiments of the invention.

FIG. 2 is a simplified block diagram of a broadband digital transceiver (BDT) 220, which depicts an example of a device suitable for use in practicing some example embodiments of the invention. As shown in FIG. 2, BDT 220 includes a power amplifier coupled to an antenna 210 and a transceiver 224. Each signal received or transmitted is up converted and for down converted by a modem 226, which, for example, can be a field programmable gate array (FPGA). A black digital signal processor (DSP) controls the transceiver 224 as well as modem 226. The MIDS-J system architecture can include a broadband digital transceiver equipped with multiple DSPs (not shown). Also, other well-known Link 16 tuning and control circuitry, as well as tactical air navigation (TACAN) functionally, is not shown in FIG. 2 to avoid obscuring the subject matter of the present invention.

BDT 220 also includes a plurality of computer-readable memory, such as a first memory 248-$m$ (1) and second memory 238-$m$ (n). Each computer-readable memory can store a plurality of computer programs. For example the first memory 248.$m$(1) includes a first program P(1) (248-P(1)) and second program P(1) (248-P(n)), while the second memory 238-$m$ (n) includes a third program P(N) (238-P(N)) and fourth program P(n) (238-P(n)). Each computer program is suitable for carrying out the various exemplary embodiments of the present invention. Moreover, each computer program is not limited to a specific memory location (e.g., first computer-readable memory 248-$m$(1) and second computer-readable memory 238-$m$(1)). Nor is BDT 220 is limited to two computer-readable memories. FIG. 2 is merely one possible non-limiting example embodiment of the present invention.

Also, shown in FIG. 2 is a I/Q sampling function 250 which is a logical representation of a combination of software ware and the execution of computer code in accordance with exemplary embodiments of the present invention. As known in the art amplitude and phase data in the polar coordinate system is represented by I and Q. In one exemplary embodiment, transceiver 220 is an L-band transceiver configured for receiving and transmitting in a frequency range of 40 to 60 GHz and configured for obtaining a sampling rate of 5 MHz at a 200 ns interval. For example, a sampling interval equal to a multiple of one Link 16 time division multiple access (TDMA) slot (7.8125 ms) can be employed within a tactical digital information Link (TADIL) J message in packed-2 double pulse (P2DP) data formats. A TADIL J message is a functionally oriented, variable-length string of one or more 70-bit words in either fixed format or variable message format. In an alternative exemplary embodiment the transceiver 220 is configured for obtaining a sampling rate from 5 MHz to more than 100 MHz. This alternative exemplary embodiment has the advantage of reducing the basic sampling cell length from 200 nanoseconds to 10 nanoseconds, with resulting improvement in granularity of range measurement, and as a corollary, velocity measurement accuracy.

Figure 3:
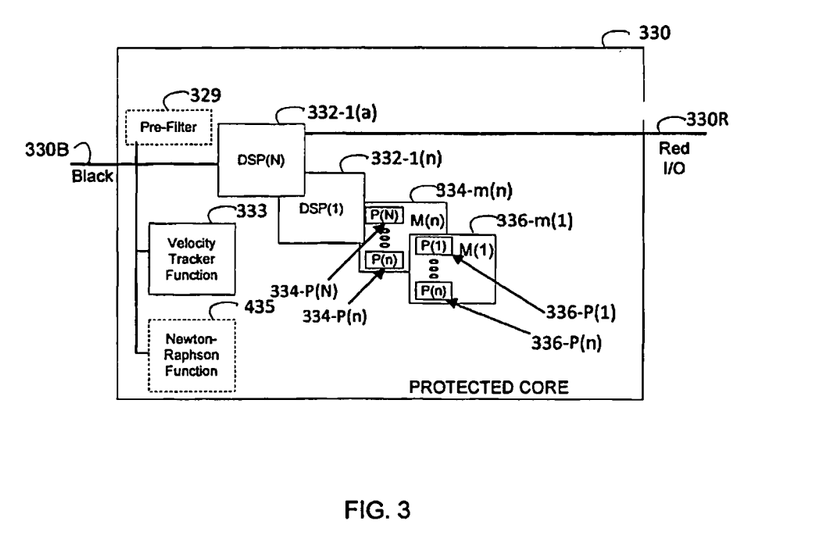
FIG. 3 is a simplified block diagram of a protected core, which is an example of a device suitable for use in practicing some exemplary embodiments of the invention.

FIG. 3 is a simplified block diagram of a protected core (PC) 330, which is an example of a device suitable for use in practicing some exemplary embodiments of the invention. As shown in FIG. 3, PC 330 includes at least two digital signal processors 332-1($a$) and 332-1($n$) coupled to a black port 330B and a red port 330R.

Each digital signal processor can further be coupled to a plurality of computer readable memory. For example, PC 330 also includes a plurality of computer-readable memory such as a first memory 336-$m$ (1) and second memory 334-$m$ (n). Each computer-readable memory can store a plurality of computer programs. For example the first memory 336-$m$(1) includes a first program P(1) (336-P(1)) and a second program P(n) (336 P(n)), while the second memory 334-$m$ (n) includes a third program P(N) (334-P(N)) and a fourth program P(n) (334-P(n)). Each computer program is suitable for carrying out the various exemplary embodiments of the present invention. Moreover, each computer program is not limited to a specific memory location (e.g., first computer-readable memory 336-$m$ (1) and second computer-readable memory 336-$m$(1). Nor is either memory limited to storing only two computer programs nor is BDT 220 limited to two computer-readable memories. FIG. 3 is merely one possible non-limiting exemplary embodiment of the present invention.

Also, shown in FIG. 3, the protected core 330 includes at least two functions which are logical representation of a combination of software/firmware and the execution of computer code in accordance with exemplary embodiments of the present invention. The first function is a velocity tracker function VTF 333 which can be in one exemplary embodiment a two state Kalman fitter or in an alternative embodiment a low pass filter (LPF) correlation peak measurement(s). As known in the art, a state estimator such as a Kalman filter is a recursive filter that estimates the state of a dynamic system from a series of incomplete and noisy measurements by providing estimates of past, present and even future states, and it can do so even when the precise nature of the modeled system is unknown. The method and computer programs describing the operation if a Geolocation Kalman filter as one exemplary embodiment of a VTF 333 is described in more detail below as well as the operation of the LPF. Another function shown in FIG. 3 is a Newton-Raphson (NR) function 435 which is employed in exemplary embodiments as an optional additional method step or computer operation to obtain more precise velocity measurements to obtain more accurate location of one or more hostile jammers. As known in the art, a Newton-Raphson algorithm is a method for finding successively better approximations to the roots (or zeroes) of a real-valued function. The NR function 335 is described in more detail below. An additional optional step is shown in FIG. 3 of applying a pre-filter 329 to the I/Q samples received from one or more broadband digital transceivers 120. This additional step is described below in more detail.

Figure 4:
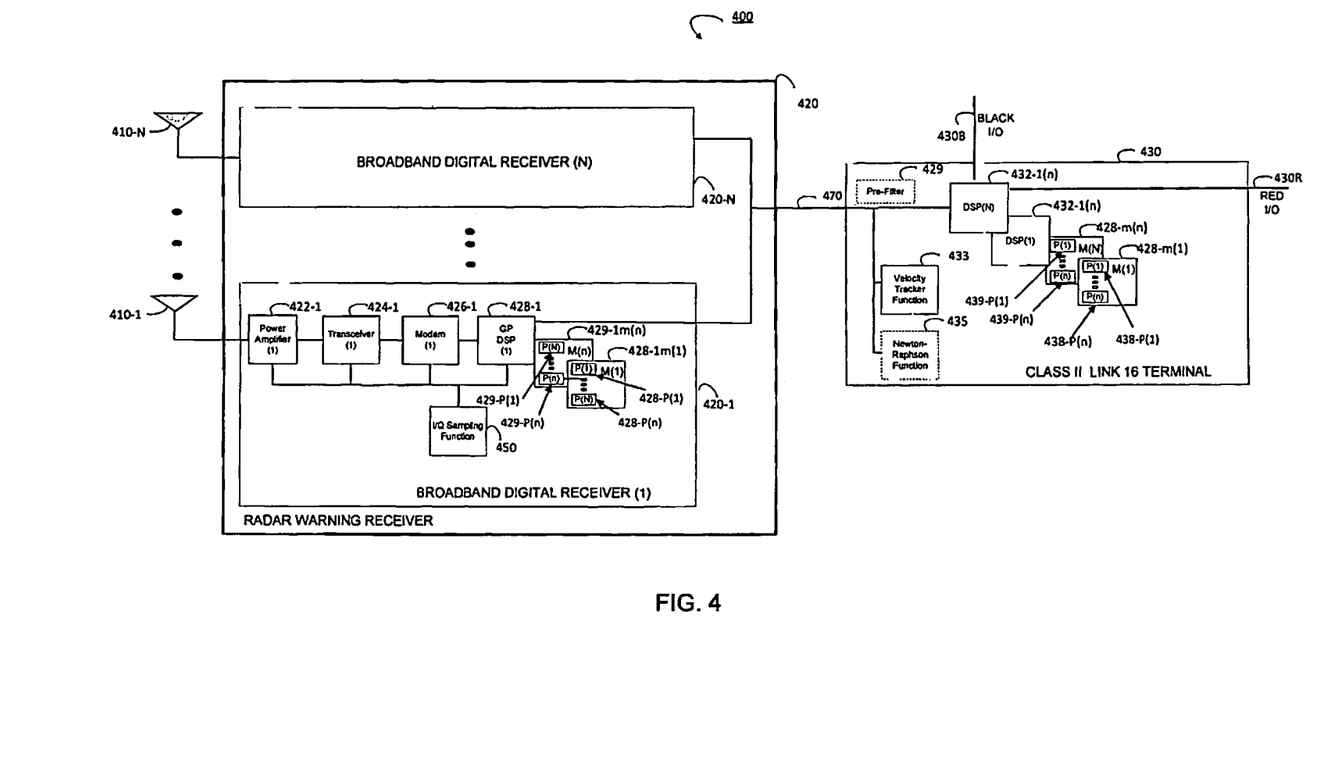
FIG. 4 is a simplified block diagram of a Class II Link 16 terminal coupled to a radar warning receiver, which is an example of a device suitable for use in practicing some exemplary embodiments of the invention.

FIG. 4 is a simplified block diagram of a Class II link 16 terminal coupled to a radar warning receiver 400, which is an example of a device suitable for use in practicing some exemplary embodiments of the invention. As shown in FIG. 4, the relevant components of the radar warning receiver (RWR) 420 are a plurality of broadband digital transceivers (BOT) such as BDT 420-1 and BDT 420-N. Each broadband digital transceivers is coupled to an antenna, such as a first antenna 410-1 coupled to a first power amplifier 422-1. For simplicity, only two broadband digital transceivers are shown in FIG. 4. A second antenna 410-N is shown coupled to a second power amplifier 422-N. As known in the art, a radar warning receiver can include more than two digital receivers. In one exemplary embodiment, the radar warning receiver 400 is an ALR 56. Each broadband digital receiver also is coupled to the protected core of Class II Link 16 terminal 430 by way of crossover connector 470.

As shown in FIG. 4, BDT 420-1 receives or transmits a signal which is up converted and down converted by its digital transceivers modem 426-1, which, for example, can be a field programmable gate array (FPGA). A general purpose digital signal processor (GP DSP) 428 controls the transceivers and modems. Depending upon the specific type of radar warning receiver, multiple DSPs may be included in each transceiver (not shown).

Each GP DPS shown in the radar warning receiver (RWR) 420 in FIG. 4 (e.g., 428-1 and 42-N) can further be coupled to a plurality of computer readable memory. For example, GP DPS 428-1 also includes a plurality of computer-readable memory, such as a first memory 428-1$m$ (1) and a second memory 429-$m$ (n). Each computer-readable memory can store a plurality of computer programs. For example, a first memory 428-1M(1) includes a first program P(1) (428-P(1)) and a second program P(n) (428-P(n)), while a second memory 429-1$m$ (n) includes a third program P(N) (429-P (N)) and a fourth program P(n) (429-P(n)). Each computer program is suitable for carrying out the various exemplary embodiments of the present invention. Moreover, each computer program is not limited to a specific memory location (e.g., first computer-readable memory 336-$m$ (1) and second computer-readable memory 336-$m$($n$)). Nor is either memory limited to storing only two computer programs nor is BOT 220 limited to two computer-readable memories. FIG. 4 is merely one possible non-limiting exemplary embodiment of the present invention.

In one exemplary embodiment, the radar warning receiver 400 includes at least four (4) narrow-band receivers each configured to examine a 3 MHz wide band (e.g., 12 MHz simultaneously scanned using the 4 receivers).

Class II Link 16 terminal 43Q includes at least two digital signal processors, 432-1(*a*) and 432-1(*n*) coupled to both a black port 4308 and a red port 430R. Each digital signal processor can further be coupled to a plurality of computer readable memory. For example, Class II Link 16 terminal 430 also includes a plurality of computer-readable memory such as a first memory 428-*m*(1) and second memory 428-*m* (*n*). Each computer-readable memory can store a plurality of computer programs. For example, a first memory 428-*m*(1) includes a first program P(1) (438-P(1)) and second program P(n) (438-P(n)), while a second memory 428-*m* (n) includes a third program P(N) (439-P(N)) and a fourth program P(1) (439-P(1)). Each computer program is suitable for carrying out the various exemplary embodiments of the present invention. Moreover, each computer program is not limited to a specific memory location % g, first computer-readable memory 428-*m*(1) and second computer-readable memory 428-*m*(*n*)). Nor is either memory limited to storing only two computer programs. Nor is the Class II Link 16 terminal 430 limited to two computer-readable memories. FIG. 4 is merely one possible non-limiting exemplary embodiment of the present invention.

Also, shown in FIG. 4 is a I/Q sampling function 450 which is a logical representation of a combination of software/firmware and the execution of computer code in accordance with exemplary embodiments of the present invention. As known in the art amplitude and phase data in the polar coordinate system is represented by I and Q. In one exemplary embodiment transceiver 424-1 is an L-band transceiver configured for receiving and transmitting in a frequency range of 40 to 60 GHz and configured for obtaining a sampling rate of 5 MHz at a 200 ns interval. For example, a sampling interval equal to a multiple of one Link 16 time division multiple access (TDMA) slot (7.8125 ms) can be employed within a tactical digital information Link (TADIL) J message in packed-2 double pulse (P2DP) data formats. A TADIL J message is a functionally oriented, variable-length string of one or more 70-bit words in either fixed format or variable message format. In an alternative exemplary embodiment, the transceiver 424-1 is configured for obtaining a sampling rate from 5 MHz to more than 100 MHz. This alternative exemplary embodiment has the advantage of reducing the basic sampling cell length from 200 nanoseconds to 10 nanoseconds, with resulting improvement in granularity of range measurement, and as a corollary, velocity measurement accuracy.

Each broadband digital receiver is coupled by way of a so-called "black port" which signifies the fact that the data received by each broadband digital transceiver is encrypted.

The protected core 130 is coupled to the four channel I/O port 140 by way of a so-called "red port" which signifies the fact that the data output from the core is unencrypted. The four channel I/O port 140 includes four red processors: red processor 1 (142), red processor 2 (144), red processor 3 (146), and red processor 4 (148). Each the four channel I/O ports 140 can handle both data and voice communications over the 960-1215 MHz frequency band. For example, red processor 1 (142) could be designated for Joint Tactical Information Distribution System (JTIDS) (Channel 1) communications providing 10/100 Ethernet data services and multiple voice ports. Red processor 2 (144) could be designated for satellite communications (SATCOM) (channel 2) providing 1000 Ethernet data services. Red processor 3 (146) could be designated for air traffic control (ATC) communications (Channel 3), a voice port and 1000 Ethernet data services. Red processor 4 (148) could be designated for military strategic and tactical relay (MILSTAR) communications (Channel 4) providing a voice port and 10/100 Ethernet data services.

Also, shown in FIG. 4, the Class II Link 16 Terminal 430 includes at least two functions which are logical representations of a combination of software/firmware and the execution of computer code in accordance with exemplary embodiments of the present invention. The first function is a velocity tracker function, VTF 433, which can be, in one exemplary embodiment, a two state Kalman filter, or, in an alternative embodiment, a low pass filter (LPF) of correlation peak measurement(s). As known in the art, a state estimator, such as a Kalman filter, is a recursive filter that estimates the state of a dynamic system from a series of incomplete and noisy measurements by providing estimates of past, present and even future states, and it can do so even when the precise nature of the modeled system is unknown. The methods and computer programs describing the operation if a Geolocation Kalman filter as one exemplary embodiment of a VTF 433 are described in more detail below, as well as the operation of the LPF. Another function shown in FIG. 4 in the Class II Link 16 Terminal 430 is a Newton-Raphson (NR) function 435 which is employed in exemplary embodiments as an optional, additional method step or computer operation to obtain more precise velocity measurements to obtain more accurate locations of one or more hostile jammers. As known in the art, a Newton-Raphson algorithm is a method for finding successively better approximations to the roots (or zeroes) of a real-valued function. The NR function 435 is described in more detail below. An additional optional step is shown in FIG. 4 of applying a pre-filter 429 to the I/Q samples received from one or more broadband digital transceivers 420. This additional step is described below in more detail.

Figure 5:
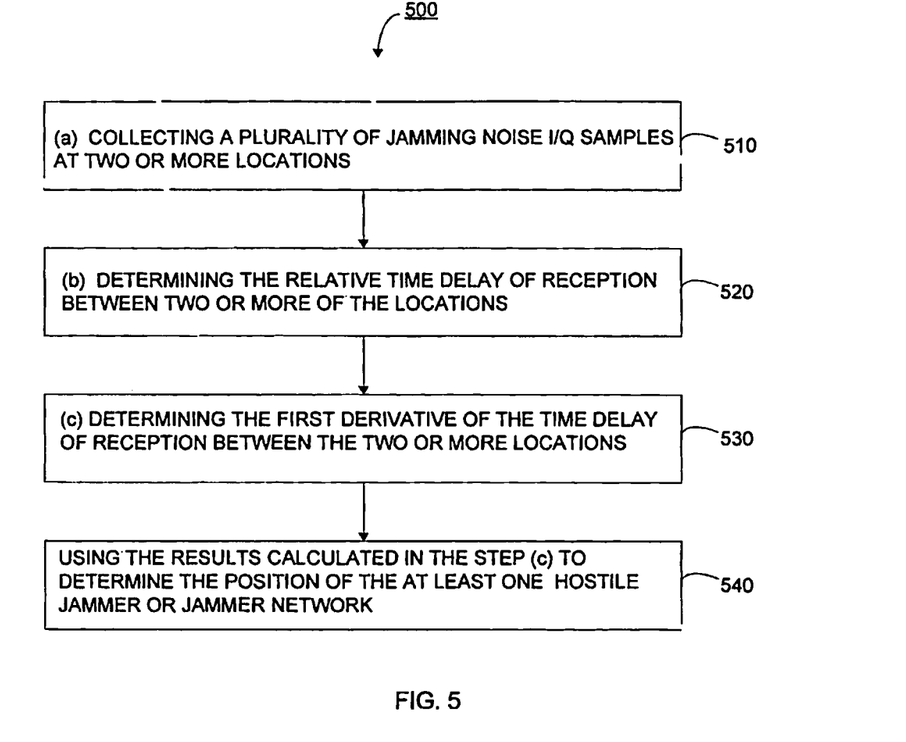
FIG. 5 is a logical flow diagram that illustrates the operation of a method, and a result of execution of computer program instructions embodied on a non-transitory computer readable memory, which provides Link 16 terminal-based geolocation of at least one hostile jammer or jammer network.

Referring now to FIG. 5, exemplary embodiments of methods, and computer programs that provide Link 16 terminal-based geolocation of at least one hostile jammer or jammer network 500 will be described. As shown in FIG. 5, the present invention comprises the following steps of (a) collecting a plurality of jamming noise I/Q samples at two or more locations (510), (b) determining the relative time delay of reception between two or more of the locations (520), (c) determining the first derivative of the time delay of reception between the two or more locations (530), and (d) using the results calculated in step (c) to determine the position of the at least one hostile jammer or jammer network (540).

(a) Collecting a Plurality of Jamming Noise I/Q Samples at Two or More Locations.

(i) Initiation of Goo-Location Processing

In exemplary embodiments of the present invention, the detection of one or more hostile jammers or jammer network by a Link 16 terminal-based geo-location can be implemented in a region of space between a near zone and a far zone. As known in the art, a near zone (or near-field) and a far zone (or far-field) are regions of time varying electromagnetic (EM) field around any object that serves as a source for the field. The near and far zones describe the way characteristics of an EM field change with distance from the charges and currents in the object that are the sources of the changing electromagnetic (EM) field. Accordingly, a near zone is where jamming energy will totally disable all Link 16 communications, and a far zone is where jamming energy cannot yet be detected. Therefore, implementation of exemplary embodiments of the present invention are ideally suited for military frontline incursions or patrols. Alternatively, implementation of exemplary embodiments of the present invention are possible in non-frontline scenarios such as in the case of detecting stationary hostile jammer network deployed in support of an enemy attack on the defensive capabilities of transport and logical support platforms (e.g., military transport aircraft, navy cargo ships or land based cargo or personal carriers)

In one exemplary embodiment, geo-location processing can be initiated in a near or far zone by employing a forward error correction (FEC) code. That is, FEC coding has several benefits such that: (1) data link deterioration is typically a gradual process as range to hostile jammer is reduced and (2) an error code can register a threshold level of erasures due to hostile jamming (i.e., at a point where communications between platforms are still ongoing). As known in the art, the Link 16 terminal can be configured to employ a (31, 15) Reed-Solomon (RS) FEC. Also, the Link 16 terminal can be configured for jammer detection through so-called "erasure thresholding." Therefore, utilizing RS FEC code in a Link 16 terminal, such as those assets which have MIDS-J system architecture, produces information on number of errors and erasures for each 31 bit block produced by the RS FEC.

(ii) Data Sample Collection and Transmission

Data Sample Collection in accordance with exemplary embodiments of the present invention includes a search phase and a maintenance phase as described below.

(1) Search Phase

In exemplary embodiments of the present invention, detection of one or more hostile jammers or jammer network by Link 16 terminal based geo-location can be implemented in an offensive or defensive manner. In one embodiment of the present invention, two or more platforms equipped with Link 16 terminal-based geolocation can detect one or more hostile jammers or jammer network in response to receiving one or more jammer signals. In an alternative embodiment, the two or more platforms equipped with Link 16 terminal-based geolocation in accordance with the present invention can detect one or more hostile jammers or jammer network by conducting a wide area search (the "search phase" or "search processing stage"). Such a wide area search can be conducted once, selectively or in a predetermined interval, until such time that a eat least one viable contact has been identified on one or more of the two or more platforms.

In the present invention a "data sample collection" is defined as the number of samples which should be taken at each measurement cycle for each platform (e.g., military or commercially contracted aircraft, ship or landed based equipment) to ensure that the correlation peaks are observable. As will be explained in more detail below, from a geometric point of view, it is clear that the magnitude of a delta time of arrivals (TOA) terms cannot exceed the horizontal distance between the two cooperators divided by the speed of light. A cooperator, as used throughout this disclosure, is two platforms equipped with Link 16 terminal-based geolocation configured in accordance with exemplary embodiments of the present invention. In one exemplary embodiment of the present invention, data sampling is maintained at a 5 MHz rate, which is the data rate used by JTIDS for communicating between end users using the Link 16 terminal. The 5 MHz data rate is but one possible non-limiting example of the present invention. Using the 5 MHz rate as an example, a simple calculation results in approximately 508×200 ns cells for every 100,000 foot separation between the two platforms. As such, roughly 101.6 microseconds are needed to search 508 cells. To obtain the I and Q components, the number of samples must first be multiplied by two, and then that result is multiplied again by two to eliminate any positive and negative signs associated with the time differences among platforms. Roughly 2000 samples per 100,000 feet is the result. In one embodiment, to save bandwidth, quantization of the amplitude measurements to 8 levels is employed. Accordingly, this embodiment results in 3 bits per sample, and a composite total of around 6 kilobits transmission per measurement cycle exclusive of the platform position and velocity data which also is shared between platforms. Another kilobit is added to the estimate to obtain a ballpark estimate of 7 kilobits/measurement cycle per 100000 foot separation between platforms. If platforms are separated by 200,000 feet, the data transmission throughput per measurement cycle during a wide area search rises to around 13 kilobits. This is a modest requirement for Link 16 terminal communications, which can support a data throughput rate of 115 kilobits/second (coded data). In one embodiment, if packed-2 double pulse (P2DP) data formats is employed, each message will have a payload of 450 bits. Thus, even in the worst case search scenario, only 29 transmission slots are required in this embodiment, and these slots may be spread out to occur over several seconds. In one exemplary embodiment, a 4096 element fast Fourier transform (FFT) or correlation length can be employed for further processing of the data samples. In another exemplary embodiment, as discussed below, during the maintenance phase, (which supports the velocity and range tracking process), a smaller FFT of 512 samples can be utilized.

(2) Maintenance Phase

The maintenance phase (or processing stage) of the operation commences following the identification of single or multiple correlation peaks during the search phase. At that point, the time delay associated with at least one hostile jammer or jammer network has been identified to a precision of one cell (200 nanoseconds). Since it is known to a high accuracy what level of time shift the multiple time series must move to achieve a correlation peak, a much smaller sample can be used to assure that correlation will be seen. In one exemplary embodiment, a sample of 512 is used to meet this condition. Using similar calculations to those performed above with respect to data collection during the search phase, approximately 7 P2DP messages can be used to support all necessary data transfer. The spacing of these messages can be selectively configured. For example, in one embodiment, a measurement cycle of one second or 128 time division multiple access (TDMA) time slots can be selected. If such spacing is selected, then only 5.5% of useful transmission bandwidth is required. Alternatively, in another embodiment, for example, the measurement cycle can be increased to 2 seconds and thereby reduces this value by one half, and so forth. Accordingly, significant observable benefits of the present invention can be shown by way of the above quick analysis in that geo-location processing, in accordance with exemplary embodiments of the present invention, can be supported with negligible impact on normal Link 16 communications traffic.

(iii) Trajectory Shaping

In the present invention, the velocities, azimuths, and the separation distance of at least two cooperators are configurable variables for trajectory shaping. As known in the art, the hyperbolic characteristics of a geographical location system depend on range and velocity difference measurements. Such range and velocity differences will produce regions in space of greater or lesser accuracies which are direct functions of the community geometry and velocity vectors. In addition, the processing characteristics of a geographical location algorithm also can produce variations.

(iv) Data Sampling (Adjusted to Delta Time of Arrival (TOA))

In one exemplary embodiment of the present invention, a delta time of arrival (TOA) is employed. That is, the present invention takes into account the fact that if strong jamming energy is encountered, the contribution of this noise to I/Q samples will likely exceed that of any background Link 16 multinet energy reception. Because these are noise samples, rather than any coded preamble signal, there is no hope of a Time of Arrival (TOA) computation. As such, by transferring "time slices" of collected I/Q data between platforms using existing Link 16 protocols, a delta TOA can be computed from roughly identical noise samples received at the two participating platforms. As will be described in more detail below, cross-correlating of the "time slice" data is applied to the I/Q samples. The length of each time slice is a subject for trade space, but will be in the range of hundreds of microseconds. The cross-correlation process performed at one of the two platforms will yield a correlation peak corresponding to the difference in the TOA between the platforms. The data transfer process between platforms can occur over a range of time measured in seconds, rather than milliseconds, to accommodate bandwidth limitations of the Link 16. The measurement period is the period covering both data collection and data transfer. This will govern the update rate of the Geolocation Kalman filter when it is invoked as described below in accordance with one possible embodiment of the present invention.

The achievement of a correlation peak (or, more property, multiple correlation peaks for multiple jammers) provides the raw input for a separate processing category, referred to as Correlation Processing. The goal of Correlation Processing is to generate the most accurate possible estimates of delta range and delta range rate as functions of time for each correlation thread, since these are needed to drive the Geolocation Kalman to Filter. There are two separate approaches for Correlation Processing which will now be described below, namely, (a) Low Pass Filtering (LPF) of the Correlation peak measurement(s), and (b) the Velocity Tracking Kalman filter (VTF).

(b) Determining the Relative Time Delay of Reception Between Two or More of the Locations (i) Correlation Processing After obtaining data samples of a plurality of jamming noise I/Q samples at two or more locations (510), exemplary embodiments of the present invention provide for detection of one or more hostile jammers or jammer network by determining the relative time delay of reception between two or more of the locations (520). In one exemplary embodiment of the present invention, correlation processing is employed. Correlation processing is an estimation element for delta range and delta range rate, utilizing the cross-correlation results of the two data streams which are merged at a common location. In one exemplary embodiment, a velocity tracker Kalman (VTF) filter is employed. In alternative exemplary embodiment of the present invention, a low pass filtering is employed. In one further embodiment, the VTF uses the correlation peak value cell number as its basic input source. As used throughout this disclosure, correlation peak cell number are identified by the letter "Z". As will be described below, one exemplary embodiment performs correlation processing in parallel for each correlation thread. That is, if there are N such threads, there will be N parallel VTF filters, and there also will be N individual Geolocation Kalman Filters.

In some exemplary embodiments of the present invention, more than one Geolocation Filters is employed. Since there is no prior information on the locations or numbers of hostile jammers or a jammer network, it will be beneficial to supply a bank of such geolocation filters with individual initial estimates of the potential jammer locations, in one embodiment, an application of the Bayes Principle can be applied to choose the most likely position estimate for each hostile jammer or jammer network. For example Mag III's Method can be employed for choosing among several potential versions of reality. Other well-known predictive statistical methods can be employed to estimate the locations of each hostile jammer or jammer network based upon the output of one or more geolocation filters.

(1) Velocity Tracking Filter (VTF)

In one exemplary embodiment of the present invention, the configuration chosen for the VTF is a two state Kalman estimator, where the first state ($x_1$) represents the interpolated estimate of Z, and the second state ($x_2$) is its first derivative. Note that although Z is an integer, its state estimate is a real number. The differential equations of the states are given as:

$$\dot{x}_1 = x_2$$

$$\dot{x}_2 = 0 \quad \text{(Equation No. 1)}$$

The model given above is that of a constant velocity system with no (short term) acceleration.

The transition matrix, $\Phi = (\Delta t)$ for the above system of equations is well known and is given by:

$$\Phi = \begin{bmatrix} 1 & \Delta t \\ 0 & 1 \end{bmatrix} \quad \text{(Equation No. 2)}$$

The Kalman Gain Matrix of this linear system is compute via the standard Formula:

$$K = PH^T(HPH^T + R)^{-1} \quad \text{(Equation No. 3)}$$

H is the observation matrix which Is given by:
H=[1 0], since the measurement Z is directly applied to $x_1$ (Equation No. 3a)

The time propagation of the state vector and covariance P is supported by the following equations:

$$x_1(t+\Delta t) = x_1(t) + x_2 * \Delta t$$

$$P(t+\Delta t) = \Phi P(t)\Phi^T + Q, \text{where } Q \text{ represents the process noise matrix} \quad \text{(Equation No. 4)}$$

In one exemplary embodiment, the following values are employed as a nonlimiting examples to provide a good balance between filter response and noise suppression:
R=40.^2
Q=2×2 Identity Matrix
Time Step Δt in range of 0.25-2.0 s An empirical formula for range can be employed in this invention to compensate for the filter time delay as a function of the estimated velocity estimate and time step size to produce a zero mean error. That formula is expressed as:

$$\text{Corrected Range Difference} = (x_1 - 3.75 * x_2 * \Delta t) * \frac{\text{feet}}{\text{unit}} \text{ of } Z \quad \text{(Equation No. 5)}$$

In one exemplary embodiment, a "scalloped" effect is rectified on the above error estimate. That is, a scalloped effect can result in the data reported, due to the fact the cell number, Z, is quantized to the full cell length (200 ns, equivalent to about 197 feet). In one embodiment, the size of the cell is reduced by faster sampling or alternatively by pre-filtering of the input data to add correlation and then interpolating the correlation peak.

(2) Correlation Low Pass Filtering

In an alternative embodiment of the present invention, a low pass filer (LPF) with a time constant of 2 seconds can be employed. The following operative MATLAB code is provided as a non-limiting exemplary embodiment of this alternative embodiment:

ZDOT(k)=(−1.0/TAU)*(ZFILT(k)−Z);
ZFILT(k+1)=ZFILT(k)+ZDOT(k)*DELT;
MEASV(k)=196.7143*ZDOT(k);
VDIFFDOT(k)=(−1.0/TAUV)*(VDFILT(k)−MEASVD (k));
VDFILT(k+1)=VDFILT(k)+VDIFFDOT(k)*DELT;
TAU=1.0 seconds
TAUV=2.0 seconds In the above code, ZDOT is the first estimate of the time derivative of Z, and ZFILT is the filtered estimate of Z itself. MEASVD is ZDOT normalized to the width of the measurement cell in feet. MEASVD is then itself low-pass filtered in the last set of equations, with VDFILT as the final estimate of the velocity difference. An additional embodiment to this particular embodiment can involve compensating for the time lag in the result to remove a significant portion of any resulting error.

(3) Geolocation Kalman Filter (GKF)

As mentioned above, in one exemplary embodiment, a geolocation Kalman fitter GKF is employed to estimate the position of multiple hostile jammers or a jammer network. Since the radiated energy from the jammers, by definition, possesses little or no predictable structure, there is no realistic way to generate accurate time of arrivals (TOA) estimates or Doppler estimates. As such, exemplary embodiments of the present invention employ as observables Delta TOA and Delta TOA dot, which are precisely the measurements which are produced by the Correlation Processing as described above.

The basic assumption underlying the navigation accuracy of the two airborne platforms is that they benefit from known and proven performance available from Link 16 Hybrid-Inertial navigation processing. As known in the art, when provided with a well-trimmed inertial platform and global position satellite (GPS) position, velocity, and time (PVT) aiding, the absolute positioning accuracy can approach 10-30 meters in WGS-84 coordinates. Moreover, advanced methods using differential GPS processing can be employed to improve that figure by an order of magnitude (in a relative sense). Relative velocity accuracies can approach 0.1 ft/second (depending on the specific platform).

(i) Geolocation Kalman Filter Modeling Protocols

Figure 6:
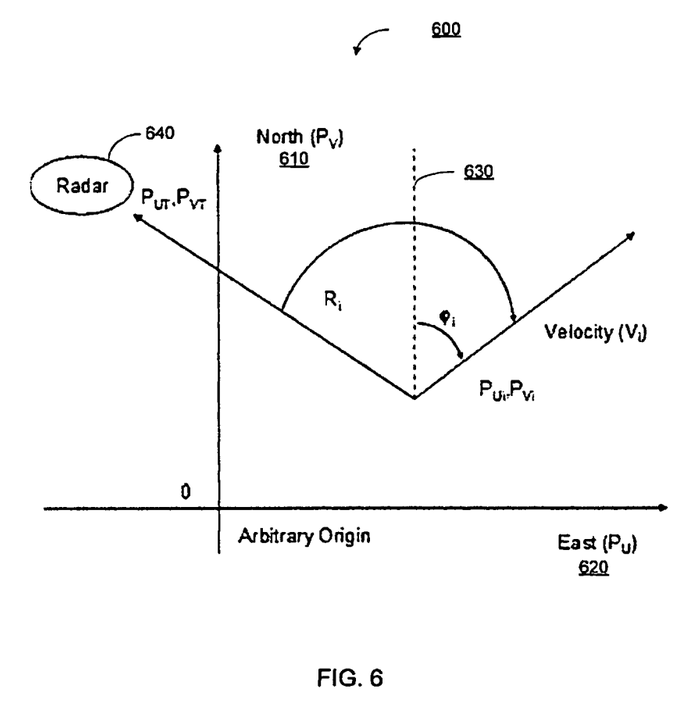
FIG. 6 is an illustration of the emitter location geometry in accordance with exemplary embodiments of the present invention.

Referring now to FIG. 6, an illustration of emitter location geometry 600 is provided to better understand exemplary embodiments of the GKF in accordance with exemplary embodiments of the present invention. In view of FIG. 6, consider a Cartesian navigation frame whose origin (610) is positioned at a convenient known location in the vicinity of the two airborne cooperators at sea level (not shown). Local east (620), north (630), and up coordinates (640) are designated of the frame as, respectively: Pu, Pv, Pw. The position coordinates of the two hypothetical airborne cooperating platforms, i=1, 2 are therefore $P_{ui}$, $P_{vi}$, $P_{wi}$. The jammer 650 is also located within this coordinate frame; its true coordinates are designated as: $P_{UJT}$, $P_{VJT}$, $P_{WJT}$. The jammer 650 is assumed to be stationary, but the cooperating platforms are not. Each platform has a known velocity component in the $P_u$-$P_v$ plane, designated as $V_i$, and a bearing $\Phi_i$. Velocity and bearings are assumed known to the accuracy associated with standard Link 16 hybrid navigation.

Although the actual scenario above is defined in three dimensions, the design of the Geodetic Kalman Filter in accordance with this invention, models the jammer horizontal components (e.g., in the $P_u$,$P_v$ plane of reference only, although cooperator and jammer $P_w$ coordinates are computed and considered when computing expected range and range rate differences). The basic assumption for each jamming element of a hostile jamming network is that it is stationary. As such, the present invention configures the GKF as a two state Kalman Filter, whose elements $x_1$, $x_2$ are the estimates of the jammer positions in the $P_u$,$P_v$ plane, namely, $x_1 \rightarrow P_{UJT}, x_2 \rightarrow P_{VJT}$ By stationarity considerations, the state propagation equations are:

$$x'_1 = 0$$

$$x'_2 = 0 \qquad \text{(Equation No. 6)}$$

The transition matrix for this system is a 2×2 Identity Matrix.

As noted earlier, there will be two measurements per measurement interval:

$$y_1 = R_2 = R_1$$

$$y_2 = \dot{R}_2 - \dot{R}_1. \qquad \text{(Equation No. 7)}$$

where $R_1$ is LOS range between the jammer and the $i^{th}$ cooperator.

In accordance with conventional Kalman Filter practice, the i, j terms of the Observation Matrix H(i, j) are computed by the expression:

$$H(i,j) = \partial y_i / \partial x_j, i,j = 1,2 \qquad \text{(Equation No. 8)}$$

The following operative MATLAB code is provided as a non-limiting exemplary embodiment of Observation Factors for Geodetic Kalman Filter for i=1:2. Note that the variable PHI(i) refers to the bearing being flown by each of the two cooperators. KK1 is a constant=238.88E-10.

```
% Generate Observation Factors for Geodetic Kalman Filter
for i = 1:2;                                                              (Equation No. 9)
    CA = cos(PHI(i));
    SA = sin(PHI(i));
    ALPHA(i) = X(1) – PU(i);
    BETA(i) = X(2) – PV(i);
    KAPPA = –KK1*(X(1)A2 + X(2)A2);
        RGE(i) = sqrt(ALPHA(i)^2 + BETA(i)A2 + KAPPAA2 );
    %estimated ranges
        FDE(i) = V(i)*(ALPHA(i)*sin(PHI(i)) + BETA(i)*cos(PHI(i)))/RGE(i);
    AX(i) = ALPHA(i)/RGE(i);
    BX(i) = BETA(i)/RGE(i);
        CX(i)  =    ((RGE(i)^2)*SA  –  ((ALPHA(i)A2)*SA  +
        ALPHAW*BETA(i)*CA)yRGE(i)^3;
        DX(i)  =    ((RGE(i)^2)*CA  –  ((ALPHA(i)*BETA(i)*SA  +
        (BETA(i)^2)*CA)))/RGE(i)^3;
end
```

-continued

```
% Compute Terms for H Matrix based on Estimated Quantities
    H(1,1) = AX(2)−AX(1);
    H(1,2) = BX(2)−BX(1);
    H(2,1) = V(2)*CX(2) − V(1)*CX(1);
    H(2,2) = V(2)*DX(2) − V(1 )*DX(1 );
% Generate Observation Factors for Geodetic Kalman Filter
for i =1:2;
        CA = cos(PHI(i));
        SA = sin(PHI(i));
        ALPHA(i) = X(1) − PU(i);
        BETA(i) = X(2) − PV(i);
        KAPPA = −KK1*(X(1)^2 + X(2)^2);
        RGE(i) = sdrt(ALPHA(1)^2 + BETA(i)^2 + KAPPAA2); %estimated
ranges
        FDE(i) = V(i)*(ALPHA(i)*sin(PHI(i)) + BETA(i)*cos(PHI(i))/RGE(i);
        AX(i) = ALPHA(i)/RGE(i);
        BX(i) = BETA(i)/RGE(i);
        CX(i)    =    ((RGE(i)^2)*SA    −    ((ALPHA(1)^2)*SA    +
ALPHA(i)*BETA(i)*CA))/RGE(i)^3;
        DX(i)    =    ((RGE(i)^2)*CA    −    ((ALPHA(i)*BETA(i)*SA    +
(BETA(i)^2)*CA)))/RGE(i)A3;
    end
% Compute Terms for H Matrix based on Estimated Quantities
    H(1,1) = AX(2)−AX(1);
    H(1,2) = BX(2)−BX(1);
    H(2,1) = V(2)*CX(2) − V(1 )*CX(1 );
    H(2,2) = V(2)*DX(2) − V(1 )*DX(1 );
```

The Kalman Gain Matrix of this linear system is computed via the standard formula:

$$K = PH^T(HPH^T+R)^{-1} \quad \text{(Equation No. 10)}$$

H is the observation matrix which is defined above in equation (9)

There is no time propagation of the state vector since it is assumed invariant with time. The measurement variance matrix, R, is chosen to be consistent with the expected delta range and range rate uncertainties resulting from the VTF:

$$R = [100.0\hat{\ }20.0; 0.0\ 10.\hat{\ }2]; \quad \text{(Equation No. 11)}$$

There will be no process noise applied to the state covariance matrix due to the rapid convergence of the solution. Operational results presented in the following paragraph may be shown to be relatively insensitive to the length of the measurement cycle. Operationally, the interval between updates can range from one second to several seconds with no effective change in results.

Jammer Location Refinement Via Newton for Obtaining Precise Velocity Measurement.

In one exemplary embodiment of the present invention, a Newton Raphson procedure, is applied to the output of the GTF TO improve velocity measurements.

The Newton-Raphson (NR) algorithm is a multidimensional generalization of the well own iterative Newton's method for obtaining roots of algebraic equations. The NR method relates differences between expected measurements and observed measurements to differences in the desired variables, (i.e., $P_u$, $P_v$, $P_w$ of the jammer coordinates). The reference range and range rate measurements are identified as $y_1$, $y_2$ and jammer altitude above mean sea level and relate differences in these measurement from expected values to deltas in jammer position by the following matrix NR equation:

$$\begin{bmatrix} \Delta y_1 \\ \Delta y_2 \\ \Delta h_T \end{bmatrix} = \begin{bmatrix} \frac{\partial y_1}{\partial P_u} & \frac{\partial y_1}{\partial P_v} & \frac{\partial y_1}{\partial P_w} \\ \frac{\partial y_2}{\partial P_u} & \frac{\partial y_2}{\partial P_v} & \frac{\partial y_2}{\partial P_w} \\ 0 & 0 & 1 \end{bmatrix} \begin{bmatrix} \Delta P_u \\ \Delta P_v \\ \Delta P_w \end{bmatrix} \quad \text{(Equation No. 12)}$$

The matrix of partial derivatives above by are denoted as S and each iteration of jammer position error is computed via use of the matrix inverse:

$$\begin{bmatrix} \Delta P_u \\ \Delta P_v \\ \Delta P_w \end{bmatrix} = [S^{-1}] \begin{bmatrix} \Delta y_1 \\ \Delta y_2 \\ \Delta h_T \end{bmatrix} \quad \text{(Equation No. 13)}$$

The process is repeated until changes in the jammer coordinates reach a predetermined threshold.

A) Approaches to Providing Accurate Range Rate Data

The effectiveness of the NR method for refining GKF residual position errors is dependent on the availability of very precise velocity measurement data. In order to refine the above NR approach, the present invention provides several additional embodiments for that purpose such as:

(a) increase in the signal sampling rate in the range of 5-100 MHz to minimize correlation offset errors and enable more accurate estimation of velocities.

The existing design of the MIDS-J broadband receiver allows the option of increasing the I/Q sampling rate by a factor of 20 to 100 MHz. This exemplary embodiment allows the range uncertainty to drop from nearly 200 feet to about 10 feet. Velocity estimates will benefit from this more accurate measurement (b) Application of signal pre-filtering as represented by the 3 MHz chip matched filter now used in Link 16 projects.

This embodiment introduces a measure of sample-to-sample time correlation of the collected data. When processed via either cross-correlation or FFTs, this has the effect of spreading of the cross-correlation peak and allow interpolation of data to minimize offset time error, as in approach (a). Normal operation of Link 16 signal processing involves the use of a 3 MHz wide chip matched filter. This will add sample to sample correlation, which will have the benefit of allowing interpolation of the peak signal to better estimate the range measurement. At present, the sharp spike resembles an impulse function which is difficult to curve fit. Link 16 TOA correlation processing benefits from an ingenious interpolation procedure, to allow a 21 foot RMS error with a sampling rate of 5 MHz.

(c) Exploitation of precise Link 16 navigation outputs, which already demonstrate velocity errors in the 0.1 ft sec range to the Newton-Raphson position refinement process.

A prime candidate for obtaining very precise velocity measurements is the computation of transformed Link 16 hybrid navigation outputs to the GKF Cartesian computational frame. The equations which define the velocity transformations to that frame are actually good (but not perfect) approximations to the exact relationships between ECEF and the Cartesian reference frame. With the very small margin for velocity error in the algorithm, replacement of the approximations with exact expressions is worthy of implementation.

B) Example Implementation of Link 16 Terminal-Based Geolocation

Figure 7:
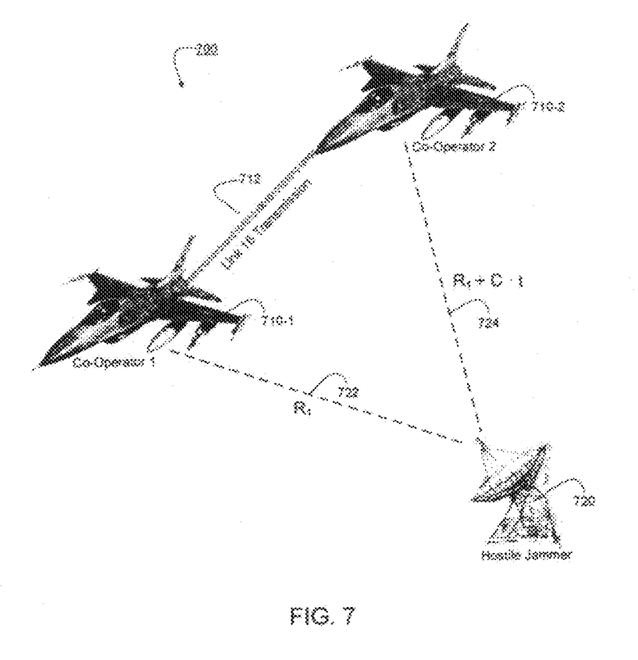
FIG. 7 depicts I/Q data collected at multiple platforms shared by way of a Link 16 transmission in accordance with at least one exemplary embodiment of the present invention.
Figure 8:
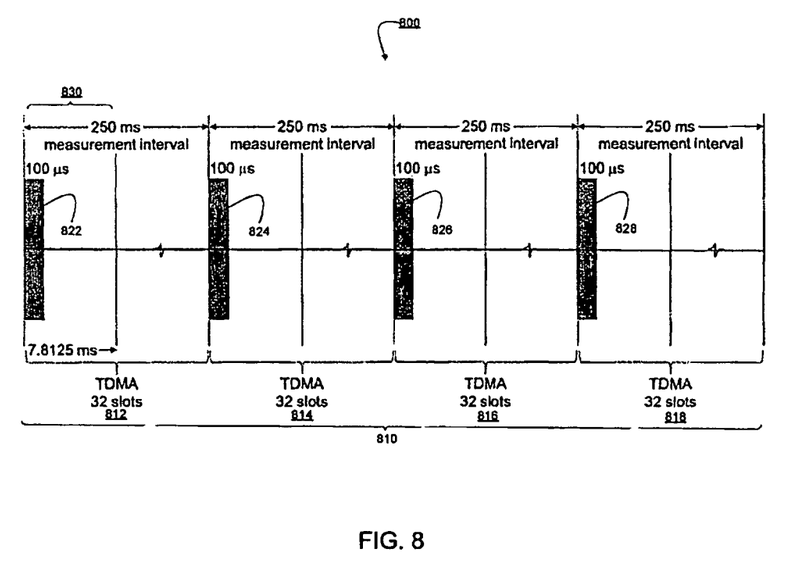
FIG. 8 depicts a tactical digital information Link (TADIL) J message employing packed-2 double pulse (P2DP) data formats in accordance with exemplary embodiments of the present invention.

FIGS. 7 and 8 are illustrations of an example implementation of one possible embodiment of the present invention. FIG. 7 depicts I/Q data collected at multiple platforms 700 shared by way of a Link 16 transmission 712 in accordance with at least one exemplary embodiment of the present invention. In particular, FIG. 7 shows first cooperator 710-1 which in this instance is a F-16 fighter plane which is sharing I/Q sampling data over a Link 16 transmission 712 with a second cooperator 710-2 which is also a F-16 fighter plane. A hostile jammer 720 is shown deployed in a stationary location.

Process initiation could commence upon the detection of data Link degradation, as measured by examining the FEC data as described above. Referring now to FIG. 8, a tactical digital information Link (TADIL) J message employing packed-2 double pulse (P2DP) data formats 800 is shown in accordance with exemplary embodiments of the present invention. In Link 16 transmissions, a TADIL-P2DP message carries 450 information bits/slot and, therefore, 6⅔ slots are required to transfer one measurements worth of data. The platform data collection involves a sampling rate of 5 MHZ over a very small interval of time (i.e., each measurement interval over the four TDMA 32 bit slots 810 includes a 100 μs I/Q data points: 822, 824, 826, and 828). The resulting use of a Kalman filter requires a nominal 4 Hz rate so that the 32 slots are available for data transfer (i.e., trade space). A 100 μs collection interval provides 500 samples or 1,000 I/Q values (or 512 and 1024 using binary equivalence). As such each, sampling interval is equal to one Link 16 TDMA time slot (7.8125 ms 830). Optionally, quantization can be applied to 8 levels so that data transfer is approximately 3,000 bits. Simultaneously with each period of data collection, platform position and velocity data, as well as bearing data, is appended to the I/Q samples for later use in the Geolocation Kalman filter. The rate of data collection and number of points per measurement cycle is balanced against the inherent bandwidth of the Link 16 waveform.

Cross correlation can be performed by using fast Fourier transform (FFT) for establishing time delays between time series data. Accuracy of delta TOA determination can be improved by using pruned cross-correlation techniques and/or parabolic interpolation. Although the basic sampling rate is 200 ns, interpolation techniques can be employed to provide a more precise interval of 10-20 ns. The resulting estimates are then run through a low pass filter with a sampling rate of 4 Hz in order to compute the time derivative of the variable delta TOA needed as observable for the Kalman filter. Also, a delta Doppler frequency value is computed for the Kalman filter. For example, a LPF estimate of the delta t time derivative can be found by the following equation:

$$\frac{\partial \Delta t}{\partial t} = -\frac{1}{\tau}(\Delta t - \Delta t \text{ in}), \quad \text{(Equation No. 14)}$$

where τ is a smoothing constant.

Referring back to FIG. 7 and FIG. 6, First cooperator 7101 makes an observation $y_1 = \Delta TOA = (R_2 - R_1)/C$, where C is the speed of light. Second cooperator 710-2 also makes an observation $y_2 = \Delta\text{frequency} = fd_2 - fd_1$, where $fd_i = -R_1/\lambda$ and λ is the wavelength in feet and R is the range to $i^{th}$ cooperator. In addition, $x_1 = P_{UT}$ is the target U position and $x_2 = PV_T$ is the target V position.

To determine the location of the hostile jammer at the second cooperator 710-2, the following equation is employed representing the Kalman filter in accordance with example embodiments of the present invention:

$$y_2 = \frac{-V_2}{C_{R_2}}\{(x_1 - P_{u2})\sin\phi_2 + (x_2 - P_{v2})\cos\phi_2\} + \frac{-V_1}{C_{R_2}}\{(x_1 - P_{u2})\sin\phi_2 + (x_2 - P_{v1})\cos\phi_1\} \quad \text{(Equation No. 15)}$$

While the e present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for Link 16-based geolocation of hostile jammers comprising the steps of:
   (a) collecting jamming noise amplitude and phase samples at a plurality of locations;
   (b) determining a relative time delay of reception between two or more of the locations; wherein the relative time delay is determined by a velocity tracking function; wherein the velocity tracking function is a geolocation Kalman filter configured to determine a delta range and delta range rate utilizing two data streams merged at a common location and using a correlation peaks vale cell number as its basic input source;
   (c) determining a first derivative of the time delay of reception between the two or more locations; and
   (d) using the results calculated in the step (c) to determine a position of at least one hostile jammer.

2. The method of claim 1, wherein the amplitude and phase samples are collected at a sampling interval equal to a multiple of one Link 16 time division access slot within a tactical digital information access slot J message employing packed two double pulse data format.

3. The method of claim 2, wherein a sampling rate is 5 megahertz and a sampling cell length is 10 nanoseconds.

4. The method of claim 1, wherein the velocity tracking function is a correlation low pass filter.

5. The method of claim 1, wherein a Newton Raphson function is applied to the output of the Kalman Filter to obtain a precise velocity measurement.

6. The method of claim 1, wherein a pre filter is applied to the collected jamming noise amplitude and phase samples prior to determining the relative time delay of reception between two or more of the locations.

7. The method of claim 1, wherein the jamming noise amplitude and phase samples are collected by one or more broadband digital transceivers in a Link 16 terminal having a employing a Link 16 terminal-J system architecture.

8. The method of claim 1, wherein the jamming noise amplitude and phase samples are collected by one or more broadband digital receivers in a radar warning receiver and the samples are output to a class two Link 16 terminal to perform steps (b)-(d).

9. A program storage device readable by a machine, tangibly embodying a program of instructions executable by the machine for performing operations, said operations comprising:
  (a) collecting jamming noise amplitude and phase samples at a plurality of locations;
  (b) determining a relative time delay of reception between two or more of the locations; wherein the relative time delay is determined by a velocity tracking function; wherein the velocity tracking function is a geolocation Kalman filter configured to determine a delta range and delta range rate utilizing two data streams merged at a common location and using a correlation peaks vale cell number as its basic input source;
  (c) determining a first derivative of the time delay of reception between the two or more locations; and
  (d) using the results calculated in the step (c) to determine a position of at least one hostile jammer.

10. The program storage device of claim 9, wherein the amplitude and phase samples are collected at a sampling interval equal to a multiple of one Link 16 time division access slot within a tactical digital information access slot J message employing packed two double pulse data format.

11. The program storage device of claim 10, wherein a sampling rate is 5 megahertz and a sampling cell length is 10 nanoseconds.

12. The program storage device of claim 9, wherein the velocity tracking function is a correlation low pass filter.

13. The program storage device of claim 9, wherein a Newton Raphson function is applied to the output of the Kalman Filter to obtain a precise velocity measurement.

14. The program storage device of claim 9, wherein a pre filter is applied to the collected jamming noise amplitude and phase samples prior to determining the relative time delay of reception between two or more of the locations.

15. The program storage device of claim 9, wherein the jamming noise amplitude and phase samples are collected by one or more broadband digital transceivers in a Link 16 terminal employing a Link 16 terminal-J system architecture.

16. The program storage device of claim 9, wherein the jamming noise amplitude and phase samples are collected by one or more broadband digital receivers in a radar warning receiver and the samples are output to a class two Link 16 terminal to perform steps (b)-(d).

* * * * *